United States Patent [19]
Bartz et al.

[11] Patent Number: 5,401,581
[45] Date of Patent: Mar. 28, 1995

[54] POLYOLEFIN-ACRYLIC BONDED COMPOSITE

[75] Inventors: Kenneth W. Bartz, Baytown; George D. Howell, Arlington; David J. Cherry, Dallas, all of Tex.

[73] Assignee: UVTEC, Inc., Arlington, Tex.

[21] Appl. No.: 168,032

[22] Filed: Dec. 15, 1993

Related U.S. Application Data

[63] Continuation-in-part of Ser. No. 995,125, Dec. 22, 1992, Pat. No. 5,338,614.

[51] Int. Cl.$^6$ ............................ B32B 27/30; B32B 27/32
[52] U.S. Cl. ........................................ 428/451; 428/448; 428/520; 428/522
[58] Field of Search ............... 428/448, 451, 520, 522

[56] References Cited

U.S. PATENT DOCUMENTS

| | | | |
|---|---|---|---|
| 4,689,085 | 8/1987 | Plueddemann | 106/287.14 |
| 4,718,944 | 1/1988 | Plueddemann | 106/287.11 |
| 4,800,125 | 1/1989 | Plueddemann | 428/405 |
| 4,849,294 | 7/1989 | Plueddemann | 428/451 |
| 5,006,573 | 4/1991 | Plueddemann | 523/214 |
| 5,049,443 | 9/1991 | Kuszaj et al. | 428/332 |
| 5,073,195 | 12/1991 | Cuthbert et al. | 106/2 |
| 5,089,291 | 2/1992 | Hayama et al. | 427/54.1 |
| 5,089,300 | 2/1992 | Plueddemann | 427/299 |
| 5,112,682 | 5/1992 | Inouye et al. | 428/353 |
| 5,167,706 | 12/1992 | Kuszaj et al. | 106/287.11 |

OTHER PUBLICATIONS

Molesky, "The Use of Magnesium Hydroxide for Flame Retardant/Low Smoke Polypropylene," presented at Polyolefins VII International Conference, (Houston, Tex.), Feb. 24–27, 1991.

*Primary Examiner*—D. S. Nakarani
*Attorney, Agent, or Firm*—David H. Judson

[57] ABSTRACT

A flame-retardant, reinforced polyolefin-crosslinked acrylic bonded composite and method of preparation thereof are provided. The method of preparing the composite includes coating the crosslinked acrylic surface with a solution of an γ-aminopropyltrialkoxysilane to form a bond therewith. The coated acrylic layer is placed in a heated press with the flame-retardant, reinforced polyolefin layer, and a tie material disposed therebetween, thereby forming a composite. The composite is compressed to allow the amino functional group to bond with the maleated polyolefin. The polyolefin is thus bonded to the crosslinked acrylic surface.

4 Claims, No Drawings

POLYOLEFIN-ACRYLIC BONDED COMPOSITE

CROSS REFERENCE TO RELATED APPLICATION

This is a continuation-in-part application of application Ser. No. 07/995,125, filed Dec. 22, 1992, now U.S. Pat. No. 5,338,614.

TECHNICAL FIELD

The present invention relates generally to a composite formed of a polyolefin and a crosslinked acrylic polymer bonded together through the interaction of a maleated polyolefin with an γ-aminopropyltrialkoxysilane coupling agent.

BACKGROUND OF THE INVENTION

Silane compounds for use as coupling agents arid in primer compositions are well known in the art. These coupling agents and compositions are often utilized to bond fillers to thermosetting or thermoplastic resins and substrates. For example, U.S. Pat. Nos. 5,006,573 and 4,800,125, both to Plueddemann, teach the use of silane based coupling agents to improve bonding effectiveness. In particular, U.S. Pat. No. 4,800,125 discloses a composition which includes the reaction product of maleic anhydride with a diamine functional silane compound to improve the performance of such silanes as coupling agents. As discussed in U.S. Pat. No. 4,800,125, such coupling agents are said to promote or improve adhesion stability between fillers or reinforcing agents and polymeric materials, thereby reducing the degradation of such materials, especially after exposure to moisture.

Heretofore, such prior art coupling agents and methods have not been successfully used to bond crosslinked acrylic surfaces to polymeric materials such as polypropylene. This is because crosslinked acrylic materials have rigid, crosslinked bonds that render the material substantially impermeable to other polymers and other substrates. The conventional silane coupling agents have not proved satisfactory to overcome this problem.

Another disadvantage associated with much of the silane coupling art has been the inability to prepare an aqueous silane solution for use at a later time. This is due to the initiation of an immediate hydrolysis reaction followed by oligomerization of the silane after preparation of the silane solution, which if not used promptly, results in ineffective bonding or a complete failure in bonding. Consequently, even if prior art silane coupling agents could prove useful for bonding polymers to crosslinked acrylics, which has not been the case, use of such agents would require special manufacturing conditions such that the silane solution would have to be used shortly after preparation.

There has therefore been a long felt need in the art to provide new techniques and materials for overcoming these and other problems associated with the prior art such that durable, stable polyolefins bonded to crosslinked acrylic articles may be manufactured in a cost effective, reliable manner.

BRIEF SUMMARY OF THE INVENTION

It is thus a primary object of the present invention to provide bonded composites formed of a polyolefin, such as polypropylene, and a crosslinked acrylic polymer.

It is another object of the present invention to provide such composites by utilizing a chemical reaction of an γ-aminopropyltrialkoxysilane and a maleated polyolefin diffused into a surface layer of the polyolefin. Alternatively, substantially all of the polyolefin is maleated rather than just a surface layer thereof.

It is another object of the present invention to provide a composite having improved bonding characteristics than previously known in the art.

It is a further object of the present invention to provide a composite which includes a more uniform distribution of the silane agent on the acrylic surface resulting in a higher tensile strength polyolefin-acrylic composite than previously known.

It is still a further object of the present invention to provide a method of preparing bonded composites preferably formed of polyolefin and crosslinked acrylic polymer.

It is yet another object of the present invention to provide a method of preparing bonded composites formed of polyolefin and crosslinked acrylic polymer, wherein the polyolefin includes a reinforcing agent that has good flame retardant characteristics to reduce the possibility of ignition or combustion of the polymeric material during manufacture and use of the composites. One suitable reinforcing agent is magnesium hydroxide, which has known flame retardant properties.

These and other objects of the invention are provided by bonding a polyolefin such as polypropylene to a cast, crosslinked acrylic surface through the intervention of a bonding agent that reacts chemically with a maleated polypropylene diffused into a surface layer of the polypropylene. The polypropylene may also be filled with a reinforcing, flame retardant agent such as magnesium hydroxide. The bonding agent is preferably a silane coupling agent such as an γ-aminopropyltrialkoxysilane. In the most preferred embodiment, the bonding agent is γ-aminopropyltriethoxysilane. The amino functional group in the silane may optionally be replaced by an epoxy, alcohol, or other functional groups known to react with anhydride groups.

In another embodiment, the polyolefin utilized is a maleic anhydride/polypropylene graft copolymer. Additionally, the bonding agent utilized is a pre-hydrolyzed solution of about 5 parts of water to 1.00 parts of a 50% solution of γ-aminopropyltrialkoxysilane in methanol.

In accordance with the method of the present invention, the bonding agent is applied to the crosslinked acrylic surface to form a coating thereon and the maleated polypropylene is either mixed into or laminated with the polypropylene. The coated surface of the acrylic polymer and the maleated surface layer of the polypropylene are then brought into contact and subjected to sufficient heat compression so as to produce a final laminated structure which possesses enhanced bonding effectiveness and improved strength. If desired, the polypropylene may include a reinforcing agent to prevent or reduce the possibility of combustion.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

DETAILED DESCRIPTION

As described generally above, the present invention provides composites formed of a polyolefin bonded to an acrylic polymer surface and a method of preparation thereof. While not meant to be limiting, the acrylic polymer surface is preferably crosslinked and cast. Bonding of such crosslinked surfaces has not heretofore been practical due to the substantially impenetrable surface of the crosslinked acrylic polymer surface. While the remainder of the present discussion relates to the bonding of a polypropylene to a crosslinked acrylic polymer surface, it should be appreciated that the techniques and materials of the present invention are useful for bonding any polyolefin to a crosslinked acrylic surface.

According to the invention, it has been found that bonding of polypropylene to a crosslinked acrylic polymer is achievable through the use of an γ-aminopropyltrialkoxysilane and a distinct tie material preferably formed of a maleated polypropylene. In one embodiment, the tie material is a grafted maleic anhydride/polypropylene copolymer. The resulting composites are suitable for use in bathroom fixtures such as bathtubs, wash basins, showers, toilets and other similar fixtures. Additionally, these composites may be used for spas, whirlpools and other decorative surfaces.

It has been known in the prior art that amino propyl groups have some miscibility with or affinity for polypropylene and thus theoretically it would be possible to use a silane containing amino alkyl groups to bond polypropylene to an acrylic surface. Yet, this affinity has generally been insufficient to provide a bond having adequate strength and effectiveness. It has now been discovered, however, that by utilizing a combination of a maleated polypropylene (or a blend of polypropylene and maleated polypropylene) or preferably, a grafted maleic anhydride/polypropylene copolymer, in conjunction with an γ-aminopropyltrialkoxysilane coupling agent, a stronger and more effective bond may be achieved to an acrylic crosslinked surface.

While many silane compounds are not stable or soluble in aqueous solution and thus require adjustments in pH or preparation immediately prior to use, γ-aminopropyltriethoxysilane is very stable in aqueous solution and accordingly provides the advantage of not requiring use of the silane solution immediately following preparation. Although the concentration of the γ-aminopropyltriethoxysilane in solution is not critical in the present invention, it is desirable to use as concentrated a solution as possible and yet maintain its solubility in water. Silane compounds are commercially available. One such compound is sold under the designation A-1100 (from Union Carbide) and is capable of coating crosslinked or crosslinkeable acrylic surfaces. Other γ-aminopropyltrialkoxysilanes are similarly suitable for use in the present invention so long as the solubility and stability in water is maintained.

It is also within the scope of the present invention to substitute an organic solvent, such as an alcohol, ether or aromatic, for the water to dissolve and disperse the silane compound prior to the coating of the acrylic. For example, Plueddemann, *Silane Coupling Agents*, 2d Ed., p.69 (1991) discusses the preparation of primers from amino-organofunctional silanes from about 5 parts water to 100 parts of a 50% solution by weight of silane in methanol. The reaction mixture undergoes hydrolysis and condensation reactions until the reaction product equilibrates and reaches its final form. During hydrolysis and condensation, the mixture increases in viscosity. Silanes prepared in accordance with this technique possess the advantage that the equilibrated products are stable indefinitely. Silanes formed in this manner act as a wetting agent and are less likely to result in bead formation than the same silane in water. As a result, the concentration of the silane primer is more uniformly distributed on the acrylic surface, thereby forming a composite with more uniform bonding.

As stated above, it is within the scope of the invention to use various maleated polyolefins such as polypropylene, polyethylene or polyisobutylene and copolymers of other α-olefins thereof. In the most preferred embodiment, the tie material is formed of a maleic anhydride/polypropylene copolymer. For purposes of illustration, however, the discussion herein will be directed to a tie material of maleated polypropylene and blends of polypropylene and maleated polypropylene. In one embodiment, the tie material is actually blended into the polypropylene (e.g., by making a dry or melt blend of the polypropylene and maleated polypropylene or the like) such that some concentration of the maleated polypropylene exists along the polypropylene surface that will be bonded to the acrylic surface. Alternatively, the entire polypropylene layer itself may be maleated although typically it will be less expensive to blend in a maleated polymer. In this case, the maleated polypropylene is miscible with the polypropylene layer and therefore for all practical purposes the tie material is not really a separate and distinct layer once adequate diffusion occurs.

The present invention includes the following method of manufacture to create the composite. Preferably, the silane solution is coated or applied to the acrylic surface by any method typically used in the art. For example, the silane solution may be applied to the acrylic surface by spray coating, brushing, water bath or dipping. Either prior to or upon application of the silane solution to the crosslinked acrylic surface, a hydrolysis reaction occurs in which silanol groups are formed, while the amino functional group (in the A-1100 compound) remains intact. Upon application to the acrylic surface, the silanol groups then form a strong bond with the acrylic surface.

In an alternative embodiment, a pre-hydrolyzed silane solution as discussed above is applied to the acrylic surface. The silanol groups in the pre-hydrolyzed solution then form a strong bond with the acrylic surface. The bonds formed in accordance with this embodiment of the invention are more evenly distributed across the acrylic surface due to the increased wetting (the decreased formation of beads).

The silane-coated crosslinked acrylic surface is then brought into contact with a surface layer of the polypropylene, the surface layer having some effective concentration of exposed, grafted maleated polypropylene. Although the precise concentration of maleated polypropylene is not critical, generally the concentration will be more than 0.05 by weight percent. The multilayer structure or composite is then compressed in a heated press or roll-stack. The press temperature is not critical, but should be at least above the melting point of the polypropylene surfaces. During compression, the free amino propyl functional group and the maleated polypropylene react to form an amide (without the elimination of water), thereby opening the ring of the maleated group as follows:

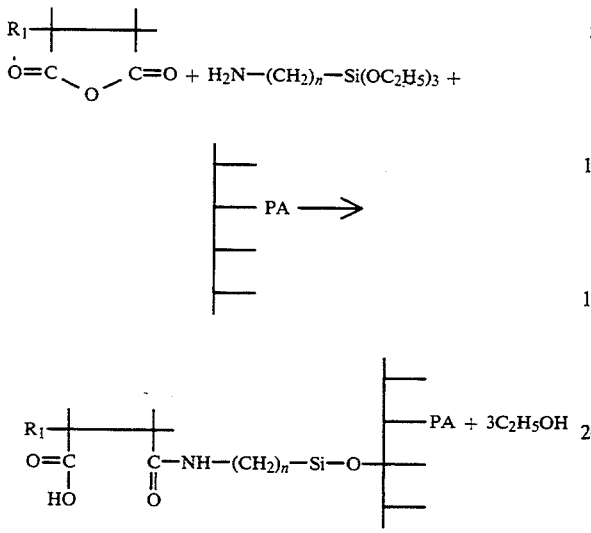

wherein $R_1$ is polypropylene, polyethylene, polyisobutylene or any polyolefin or copolymer thereof that can be maleated; n is 1-10; and PA is a polyacrylate surface, preferably having a crosslinked surface. In a preferred embodiment n=3, such that the silane compound is γ-aminopropyltriethoxysilane.

As illustrated above, the present invention provides for the bonding of polypropylene to crosslinked acrylic surfaces without creating any byproducts. Alternatively, an alcohol, or epoxy may be substituted for the amino group such that an ester or anhydride linkage is created.

While the preferred embodiment utilizes γ-aminopropyltriethoxysilane as a preferred silane coupling agent, it is within the scope of the present invention to substitute other trialkoxysilanes so long as the silane compound is stable in solution and the appropriate hydrolysis reaction occurs either prior to or upon application of the silane solution to the crosslinked acrylic surface. One of the advantages of the present invention is that γ-aminopropyltriethoxysilane is stable in aqueous solutions and thus does not require preparation of the solution immediately preceeding use. Other silanes, while useful in the present invention, require adjustment in pH to increase their stability in aqueous or other media. In addition, the hydrolysis reaction may occur prior to contact or during contact with the crosslinked acrylic surface and still provide a bonding composite which has improved strength. Moreover, the alternative embodiment which utilizes the silane compound in an aqueous/alcohol solution is particularly advantageous in view of the increased wettability (i.e., reduction in bead formation).

In accordance with the present invention, the use of maleated polypropylene or a mixture of maleated polypropylene and polypropylene increases the bonding effectiveness in the final product. The maleated polypropylene is miscible with the polypropylene such that when the composite is subjected to heat compression at a temperature equal to or greater than the melting point of the polypropylene, the tie material diffuses into and is miscible with the polypropylene at its surface. Consequently, in one embodiment the initial form of the tie material (whether pelletized, powdered or formed in a film), is mixed into the polypropylene and thus does not appear as a distinct layer. The use of the tie material not only increases the bonding effectiveness in the final product; it is also more cost effective to use than maleated polypropylene for bonding directly to the acrylic surface through the silane coupler.

Several maleated polypropylenes are commercially available. Two such examples are sold under the trade names ADMER 700 available from Mitsubishi or PB 3005 available from British Petroleum.

While ADMER is a desirable tie layer in accordance with the invention, the most preferred embodiment utilizes a maleic anhydride/polypropylene graft copolymer. This copolymer is commercially available from Aristech under the trade name UNITE. The primary difference in the tie materials as related to the present invention is the difference in tensile strength. Maleic anhydride/polypropylene graft copolymer has a much higher tensile strength (about 5000 psi) than maleated polypropylenes such as ADMER, which has a relatively lower tensile strength. Consequently, composites formed with the maleic anhydride/polypropylene graft copolymer possess stronger bonds than those formed with maleated polypropylene.

In another embodiment, magnesium hydroxide is used in the polypropylene or copolymer as a flame retardant and a reinforcing agent. Magnesium hydroxide is a known flame-retardant and thus provides a further advantage to the final composite.

EXPERIMENTAL

The following composites were formed in order to evaluate the adhesion and bonding characteristics of composites made according to the present invention: (1) a composite made by placing a tie material between the polypropylene and crosslinked acrylic surfaces without the use of a silane coupling agent; (2) a composite formed through the use of a silane coupling compound (without the use of a tie material) between the polypropylene and acrylic; and (3) a composite formed according to the invention by including both a tie material and a silane coupling compound between the surfaces.

The procedure used to make the first composite included the following. Approximately one square inch of 60% $Mg(OH)_2$ by weight in polypropylene was dried in a hot air oven at about 200° F. for approximately 2-3 hours. A tie material, in particular, maleic anhydride grafted onto polypropylene (sold under the trade name PB 3009), was placed between the polypropylene and approximately one square inch of cast, crosslinked acrylic such as that manufactured by Aristech Chemical, thereby forming a composite. A similar composite was made using maleic anhydride grafted onto polyethylene (sold under the trade name ADMER 700). The resulting composite was then placed between two stainless steel plates. The steel plates were then placed in a press having platens heated to about 450°-500° F.

Thereafter, the press was manually lowered in a manner sufficient to exert a slight pressure on the composite and the composite was pressed for about five minutes. Pressure was reapplied to again compress the composite. The pressure was then relieved and the plates were removed from the press. Water was applied to the plates to cool the materials and the composite was then removed. The plastic composite was allowed to further cool and harden overnight.

A similar technique was used to create the second polypropylene/acrylic composite, except in this case, the silane coupler (A-1100) was used in place of the maleated polypropylene. In both cases, however, the two plastic chips could be manually peeled or pried apart. Moreover, the samples tended to be unextrudable and/or brittle. Further the tie material or silane exhibited poor adhesion to the acrylic and/or polypropylene.

The third composite comprised a flame-retardant polypropylene surface bonded to a crosslinked acrylic surface as follows. An aqueous solution of γ-aminopropyltriethoxysilane (A-1100) was prepared and the cast, crosslinked acrylic chip was placed in the silane solution for about one minute or coated in an equivalent manner. Alternatively, the acrylic chip could have been coated with the silane solution using any of the techniques known in the ark. The coated chip was then removed and placed in a hot air dryer at about 200° F. for approximately 15 minutes.

The coated, crosslinked acrylic chip and the Mg(OH)$_2$ filled polypropylene with the tie material therebetween were placed in a press, and laminated as discussed above. It should be noted that while the pressure applied to the composite was not critical, it was not necessary to exert more than 1 atmosphere (14.696 psi) pressure. Additionally, the temperature of the heated press was not critical, but was at least as high as the melting point of the polyolefin substrate used. As compared with composites (1) and (2), the resulting composite displayed improved bonding characteristics, including increased durability, stability and adhesion to the acrylic and polypropylene surfaces. The third composite was also less brittle than composites prepared in accordance with (1) and (2).

In an alternative embodiment of the invention, the tie material and the filled polypropylene are coextruded. The acrylic surface is then laminated onto the coextrudate. In yet another embodiment, the acrylic substrate may be substituted by a metal, a metal oxide, ceramic, glass or any other material which will sufficiently bond to the silane compound. Moreover, the acrylic substrate may be crosslinkeable rather than crosslinked.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A bonded composite, comprising:
   a crosslinked acrylic surface coated with an alcohol-based primer having a functional silane compound selected from the group consisting of γ-aminopropyltrialkoxysilane, γ-epoxypropyltrialkoxysilane and γ-hydroxypropyltrialkoxysilane; and
   a polyolefin layer having a surface containing a maleated functionality, wherein the functional silane compound bonds to the maleated functionality of the polyolefin surface layer and to the crosslinked, acrylic surface.

2. The composite as described in claim 1, wherein the polyolefin layer is a maleic anhydride/polypropylene graft copolymer.

3. A bonded composite, comprising:
   a crosslinked acrylic surface coated with an alcohol-based primer having a functional silane compound—selected from the group consisting of γ-aminopropyltrialkoxysilane, γ-epoxypropyltrialkoxysilane and γ-hydroxypropyltrialkoxysilane, the primer acting as a wetting agent to thereby minimize bead formation on the acrylic surface, wherein the silane compound is formed by:
       mixing about 5 parts water to about 100 parts of a solution comprising about 50% of the silane and 50% of an alcohol;
       allowing the mixture to undergo hydrolysis and condensation, thereby forming a product; and
       allowing the product to equilibrate to form a final product; and
   a polyolefin layer having a surface containing a maleated functionality, wherein the functional silane compound bonds to the maleated functionality of the polyolefin surface layer and to the crosslinked, acrylic surface.

4. The composite as described in claim 3, wherein the polyolefin layer is a maleic anhydride/polypropylene graft copolymer.

* * * * *